June 2, 1942.  H. G. VEEDER  2,284,999
HEATING SYSTEM
Filed Aug. 12, 1938  2 Sheets-Sheet 2

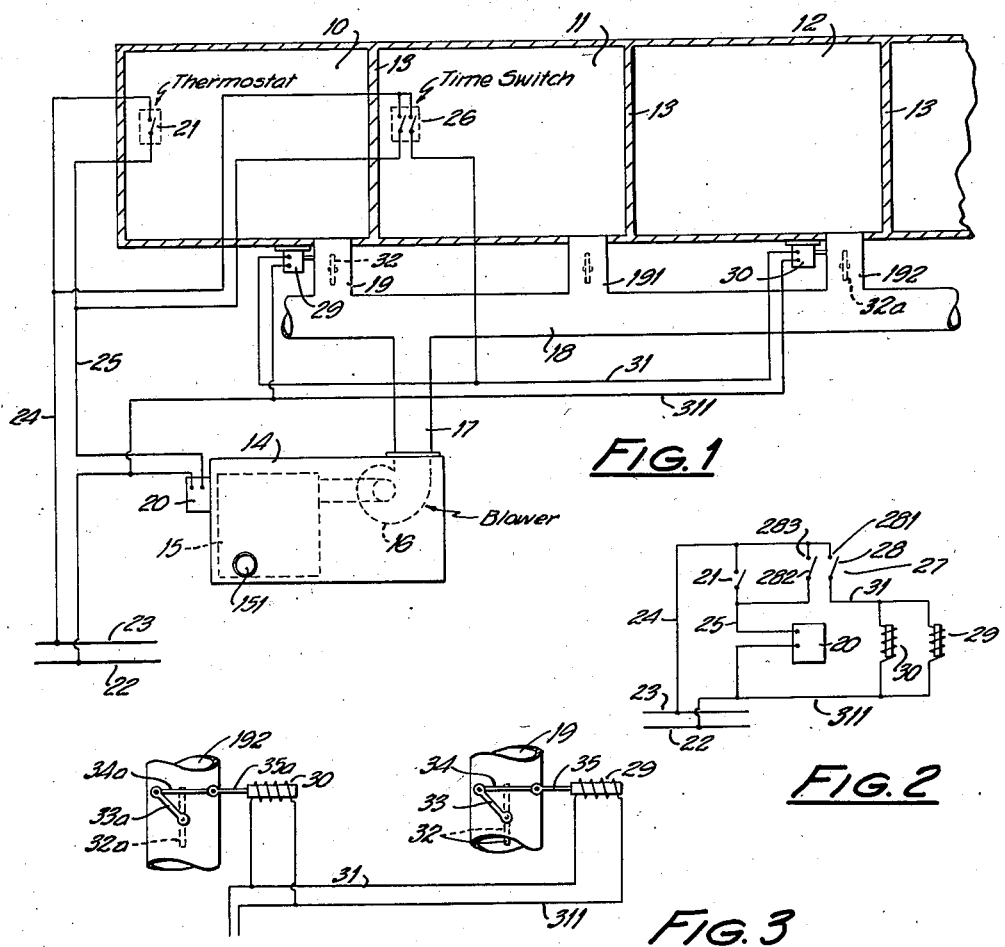

INVENTOR
Harold G. Veeder
by Daniel L. Word
ATTORNEY

Patented June 2, 1942

2,284,999

UNITED STATES PATENT OFFICE 2,284,999

HEATING SYSTEM

Harold G. Veeder, Loudonville, N. Y.

Application August 12, 1938, Serial No. 224,421

8 Claims. (Cl. 236—10)

My invention more particularly relates to a heating system in which a fluid medium is heated and distributed to a plurality of enclosed spaces, such, for example, as the rooms of a dwelling, where heat is extracted from the heated medium, the medium then preferably being returned to a position where it may be reheated.

I have illustrated my invention in a system in which the fluid utilized is hot air, although it is to be understood that my invention is applicable to a hot water or steam heating system.

In a household heating system it is common to control the amount of heat delivered to the fluid medium by means of a master thermostat which may be located in the living room or other desired position. In homes, particularly, the disadvantage is commonly encountered that in the morning when it is desirable to have a bedroom warm in which to dress, the temperature is too low to dress in comfort, due to the fact that the bedroom is generally kept at a temperature below that of the living room or other room in which the main thermostat is located and also due to the fact that the air does not circulate from one room to another. Furthermore, at the time the occupant of the bedroom rises and wishes to dress, the temperature of the main living room or other space in which the main thermostat is located may be sufficiently high and the heating unit may just be going off. The bedroom would have to wait for heat, consequently, until the room in which the room thermostat is located has cooled sufficiently to actuate the room thermostat and energize the heating unit with the result that it would require a very considerable lengh of time to raise the temperature of the given bedroom to a comfortable dressing temperature. It will, of course be understood that it may be desirable for reasons other than those presented above to raise the temperature of a given room more quickly than can be done with the usual heating system and the conditions discussed above are to be considered as typical only.

In accordance with my invention means are provided for quickly raising the temperature of a desired room to the desired point.

My invention will best be understood by reference to the accompanying drawings in which I have illustrated a preferred embodiment thereof, and in which, Fig. 1 is a diagrammatic view illustrating my invention embodied in a hot air heating system;

Fig. 2 is a diagrammatic view illustrating the electrical controls which cooperate in raising the temperature of a desired enclosed space to a desired point;

Fig. 3 is a side view illustrating dampers in two hot air supply pipes or registers 19 and 192 and solenoids connected to the respective dampers for operating the same;

Fig. 4 is a view illustrating my invention in connection with a return system for the fluid heating system.

Like reference characters indicate like parts throughout the drawings.

Figure 5:
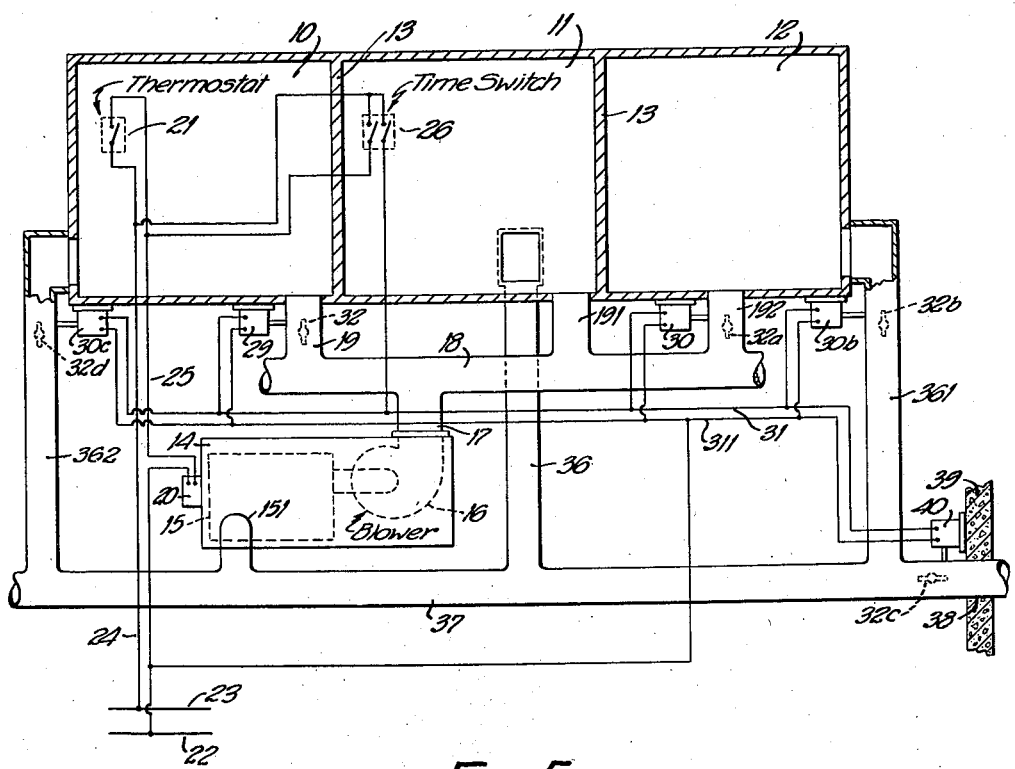
Fig. 5 is a view similar to Fig. 4 but showing the master control and my invention used in connection with three rooms as in Fig. 1.

Referring to the drawings, 10, 11 and 12 represent enclosed spaces, such as rooms of a dwelling house, defined by walls 13. In the present embodiment of my invention, a furnace 14 heats air in a chamber 15 which is in good heat conducting relation to the furnace. An intake 151 conducts air to the space 15, and in case the fluid medium is returned to the heater, it is returned to the intake 151 regardless of the location of the intake in relation to the furnace. A blower 16 forces the heated air to a supply pipe 17 which leads to a manifold or plenum chamber 18 from which air is delivered to the pipes or registers 19, 191 and 192 and to the respective enclosed spaces 10, 11 and 12. While I have illustrated a blower, it will be understood that my invention is also applicable to a gravity system.

The operation of the furnace is governed by a suitable control device 20 which is here illustrated as electrically operated. The nature of the control will, of course, depend upon the character of fuel used and upon the particular type of furnace. For example, in case of an oil burner, the device 20 may control the admission of air, the fuel supplied to the furnace, and the igniters. In the embodiment of my invention illustrated, the operation of the control device 20 is governed by a master temperature responsive device or thermostat 21 which is connected to service lines 22 and 23 by conductors 24 and 25, the control device 20 being included in the conductor 25.

Assuming that the room or other enclosed space 11 is the one in which heat may be required promptly, a device is installed therein which controls the system in such a way that heat may be supplied thereto promptly. In the present embodiment of my invention, a device 26 represents a time switch of any known and desirable character. The time switch, in the embodiment of my invention illustrated, comprises a double pole switch indicated generally at 27 in Fig. 2, one arm 28 of which engages a contact 281 connected to the conductor 24 and which is also connected to a conductor 31 connected to two solenoids 29 and 30. The other arm 282 of the time switch engages a contact 283 which is also connected to the conductor 24 and is also connected to the conductor 25 which is, in turn, connected to the control device 20 and to the service line 22.

There are available time switches that may be manually set for any desired length of time and at the end of that time, a suitable signal such as a gong, a light or any other desired character of signal will be given, and the operator thereupon turns off the time switch. While I have included this switch under the broad expression "time switch," it is more properly a time signal. There are also available time switches which are turned on manually and which are turned off automatically after a predetermined time, and there are also available time switches which are turned on automatically at a predetermined time and turned off automatically after a further predetermined time. Any of the foregoing switches are suitable for the purposes of my invention.

In the present embodiment of my invention, solenoids 29 and 30 are provided for operating dampers 32 and 32a located in the registers or pipes 19 and 192, respectively, which conduct heated air to the enclosed spaces other than the one in which the time switch 26 is disposed. Referring particularly to Fig. 3, the solenoids 29 and 30 are connected to the dampers 32 and 32a, respectively, in the pipes 19 and 192 which are provided with operating arms 33 and 33a connected by links 34 and 34a to the ends of the cores 35 and 35a of the solenoids. When the solenoid 29 is energized, the core 35 is drawn to the right as viewed in Fig. 3 and the arm 33 rotated clockwise to close the damper 32. It will be evident that the operation of both solenoids 29 and 30 and the dampers actuated thereby is or may be the same. It will, of course, be understood that any desired type of damper may be used.

In the embodiment of my invention illustrated in Fig. 4, I have shown an air circulating system in which ducts 36 and 361 are provided for the return of the air from which heat has been extracted in the enclosed spaces 11 and 12, respectively, to the chamber 15 through a common pipe 37 which is connected to the intake 151 to chamber 15, where it may be reheated by the furnace. The damper 32b which is located in the return pipe or register 361 may be actuated by a solenoid 30b connected in parallel with the solenoid 30. It will also be understood that dampers in the other return pipes may be similarly operated.

In order to avoid duplication in the drawings, so far as possible, I have shown in Fig. 4 only one of the solenoids 30 and associated parts for actuating the dampers in the registers or pipes which supply hot air to the enclosed spaces other than that in which the time switch is located, it being understood that similarly connected solenoids and parts for actuating the associated dampers will be provided for the ducts leading to other enclosed spaces.

In the embodiment of my invention illustrated in Fig. 4, I have shown a pipe 37 passing through an opening 38 in a wall 39, through which pipe outside fresh air is supplied to the pipe 37, and to the intake 151. I have shown a damper 32c in the pipe 37 actuated by a solenoid 40, connected in parallel with the solenoids 30 and 30b, as closing the damper 32c at the same time as dampers are closed in the return pipe 361 and also in the registers leading to the enclosed spaces other than that in which the time switch 26 is located. The necessity is thereby avoided of heating outside air and correspondingly decreasing the time required to bring the temperature of the room in which the time switch is located to the desired temperature.

While I may operate the dampers in the hot air supply ducts only, I prefer also to operate those in the return pipes as well as that in the pipe which supplies outside air when such pipes are provided. In Fig. 5 I have illustrated my invention in a system similar to Fig. 4 and to which like reference characters are applied. I have, however, designated the return pipe for the room 10 by the reference character 362 the flow of air in which is controlled by a damper 32d which is actuated by a solenoid 30c.

The operation of the heating system illustrated in Fig. 4 in which I have illustrated two rooms 11 and 12, is as follows. Normally, the temperatures in the living room and other rooms of a dwelling house are controlled by the master temperature responsive device 21, (not shown in Fig. 4). Assuming that a person occupying the bedroom 11 desires to heat the room quickly, he operates the time switch 26 thereby closing the circuit to the control device 20 for the furnace thereby heating the fluid medium, and this operation takes place irrespective of the operation of the thermostat 21, the circuit being closed to the control device 20 whether the circuit in the thermostat 21 is open or closed. At the same time the solenoids 30 and 30b close the dampers 32a and 32b in the register 192 and the return pipe 361, respectively, thereby directing the movement of the heated medium to the space 11, in which the time switch is located and in which heat is desired. At the same time, the damper 32c in the pipe that supplies outside cold air is closed.

After the lapse of a predetermined period of time the time switch is opened and the system is restored to its normal operating condition, thereby removing the danger of the user of the particular room 11 leaving the building and forgetting to turn off the switch, as would be the case with a switch manually moved to its "on" and "off" positions and thus removing the danger of the particular room or the heating system being overheated and a possible fire.

It will, of course, be understood that while I have shown the time switch placed in a bedroom or enclosed space, the time switch could also control the temperature of a second or more rooms by supplying heat to said second or more rooms of the same character as that supplied to room 11 and which would respond to the operation of the time switch 26. When I refer in the claims, therefore, to an enclosed space in which a time switch is operated, I mean to cover one or more enclosed spaces the heat of which is controlled by a single time switch located in a given room.

Hence, while I have described my invention in its preferred embodiments, it is to be understood that the words which I have used are words of description and not of limitation, and that changes within the purview of the appended claims may be made without departing from the true scope and spirit of my invention in its broader aspects.

What I claim is:

1. In a system of the character described, means defining a plurality of enclosed spaces, means for heating a fluid medium, means for delivering the heated medium to the respective spaces, a master temperature responsive device located in one of said spaces, means responsive to the operation of said device for controlling the operation of said heating means, a manually operated time switch located in a second space, means responsive to the operation of said time switch for governing the operation of said heating means irrespective of said master temperature responsive device and means operable in response to the operation of said time switch for simultaneously preventing the flow of the heated medium to the enclosed spaces other than the space in which said time switch is located.

2. In a system of the character described, means defining a plurality of enclosed spaces, means for heating a fluid medium, an electrically operated device for controlling the operation of said means, means for delivering the heated medium to the respective spaces, a master temperature responsive device located in one of said spaces for governing the operation of said electrically operated device, a manually operated time switch located in a second space, and means responsive to the operation of said time switch for governing the operation of said electrically operated device irrespective of the operation of said master temperature operated device and for simultaneously preventing the flow of heated medium to the enclosed spaces other than the space in which said time switch is located.

3. In a system of the character described, means defining a plurality of enclosed spaces, means for heating a fluid medium, means for delivering the heated medium to the respective spaces and for returning the medium from which heat has been extracted in the respective spaces to a position in good thermal relation with said heating means, a master temperature responsive device located in one of said spaces, means responsive to the operation of said device for operatively energizing and de-energizing said heating means, a time switch located in a second space, means responsive to the operation of said time switch for energizing and de-energizing said heating means irrespective of the operation of said master temperature responsive device and for simultaneously preventing the flow of heated medium to the enclosed spaces other than that in which said time switch is located and for preventing the return of the medium from which heat has been extracted to a position where it may be reheated by the heating means.

4. In a heating system of the character described, means defining a plurality of enclosed spaces, means defining an air chamber, heating means for imparting heat to the air in said chamber, means for delivering heated air from said chamber to the respective enclosed spaces, means for returning the air from which heat has been extracted to said chamber, a master temperature responsive device located in one of said enclosed spaces, means responsive to said temperature responsive device for governing the operation of said heating means, a time switch located in another of said enclosed spaces, and means responsive to the operation of said time switch for governing the operation of said heating means irrespective of said temperature responsive device and for preventing the flow of the heated medium to the enclosed spaces other than the space in which said time switch is located and for preventing the return of medium from which heat has been extracted from the spaces other than that in which said time switch is located.

5. In a system of the character described, means defining a plurality of enclosed spaces, means defining an air chamber, heating means for imparting heat to the air in said chamber, heating means for returning the air from which heat has been extracted in said enclosed spaces to said chamber, means for supplying outside air to said chamber, means for delivering heated air from said chamber to the respective enclosed spaces, a master temperature responsive device located in one of said spaces, means responsive to the operation of said temperature responsive device for governing the operation of said heating means, a time switch located in one of said enclosed spaces, and means responsive to the operation of said time switch for governing the operation of said heating means irrespective of said temperature responsive device, for preventing the flow of heating medium to the enclosed spaces other than one in which said time switch is located, for preventing the return of air from said enclosed spaces to said chamber and for shutting off the supply of air from the outside.

6. In a system of the character described, means defining a plurality of enclosed spaces, means for heating air, means for delivering the heated air to the respective enclosed spaces, a master temperature responsive device located in one of said spaces, means responsive to the operation of said device for controlling the operation of said heating means, a manually operated time switch located in a second space, and means responsive to the operation of said manually operated time switch for governing the operation of said means for heating the air irrespective of the operation of said temperature responsive device and for preventing the flow of heated air to the spaces other than that in which said time switch is located and for preventing the return of the air from which heat has been extracted from the spaces other than that in which said time switch is located.

7. In a system of the character described, means defining a plurality of enclosed spaces, means for heating a fluid medium, means for delivering the heated medium to the respective spaces and for returning the medium from which heat has been extracted in the respective spaces to a position in good thermal relation with said heating means, a temperature responsive device located in one of said spaces, means responsive to the operation of said device for operatively energizing and de-energizing said heating means, a time switch located in a second space, means responsive to the operation of said time switch for energizing and de-energizing said heating means irrespective of the operation of said temperature responsive device and for simultaneously impeding the flow of heated medium to the enclosed spaces other than that in which said time switch is located and for impeding the return of the medium from which heat has been extracted to a position where it may be reheated by the heating means.

8. In a heating system of the character described, means defining a plurality of enclosed spaces, means defining an air chamber, heating means for imparting heat to the air in said chamber, means for delivering heated air from said chamber to the respective enclosed spaces, means for returning the air from which heat has been extracted to said chamber, a temperature responsive device located in one of said enclosed spaces, means responsive to said temperature responsive device for governing the operation of said heating means, a time switch located in another of said enclosed spaces, and means responsive to the operation of said time switch for governing the operation of said heating means irrespective of said temperature responsive device and for impeding the flow of the heated medium to the enclosed spaces other than the space in which said time switch is located and for impeding the return of medium from which heat has been extracted from the spaces other than that in which said time switch is located.

HAROLD G. VEEDER.